May 21, 1968   K. W. EXWORTHY   3,384,805
RMS MEASURING CIRCUIT
Filed Dec. 23, 1965

INVENTOR.
KENNETH W. EXWORTHY
BY
ATTORNEY

United States Patent Office 3,384,805
Patented May 21, 1968

3,384,805
RMS MEASURING CIRCUIT
Kenneth W. Exworthy, Minneapolis, Minn., assignor to Honeywell Inc., Minneapolis, Minn., a corporation of Delaware
Filed Dec. 23, 1965, Ser. No. 515,823
5 Claims. (Cl. 321—9)

ABSTRACT OF THE DISCLOSURE

Apparatus for accurately converting an AC signal into a DC signal which is proportional to the RMS value of the AC signal. A harmonic filter is provided to remove the harmonics from the input AC signal and the resulting signal is rectified by an amplifier-bridge circuit to give an output which is not limited by the bridge diode characteristics.

---

Figure 1:
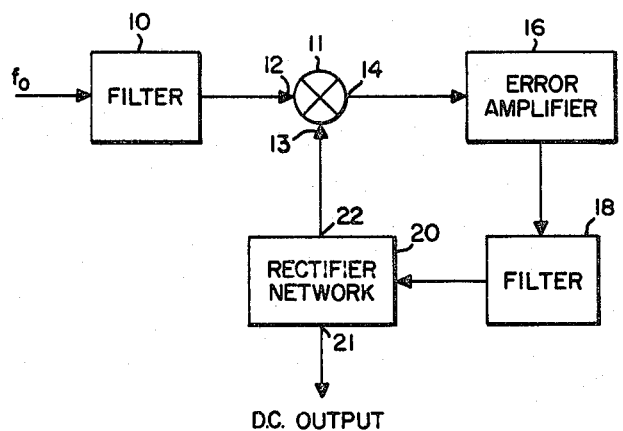

The present invention pertains to means for accurately converting an alternating signal to a direct current signal. More particularly, the present invention pertains to means for receiving an input AC signal and for providing an output signal which is indicative of the RMS value of the AC signal.

Many arrangements have been proposed in the prior art for converting an alternating signal to a direct signal whose magnitude is indicative of the amplitude of the alternating signal. Many of these arrangements have the ability to give an accurate indication of the average of the AC signal. Difficulty has been encountered, however, in attempts to provide a means for accurately measuring the RMS value of an AC signal. If the AC signal is a pure sinusoid there is no problem, since the measurement of the average of the signal is also an indication of the average of the signal is also an indication of its RMS value, the relation between the average and the RMS value of a simple sinusoid being simply a constant of proportionality. If harmonics are present in the signal, however, this simple linear relationship between the average and the RMS value no longer exists. While the contribution of the harmonics to the average value is of approximately the same percentage as their contribution to the AC signal, the contribution of the harmonics to the total RMS value is equal to the percentage squared. Thus, where the percentage of the harmonics in the AC signal is small, their contribution to the RMS value will be much less significant than their contribution to the average value. Where the percentage of the harmonics is sufficiently small, their contribution to the RMS value may in fact be insignificant, while their contribution to the average value can not be ignored. It is to this type of situation that the present invention is directed.

Reference will be made here to a particular application in which the present invention has been found to work well. It is understood, however, that the present invention is not limited to this application and that many situations will arise where the apparatus disclosed here may be put to beneficial use.

In inertial instruments of the type wherein the inertial member is supported by means of electrostatic fields and where these electrostatic fields are created by a suspension system of the type illustrated in co-pending application Ser. No. 242,549, filed on Dec. 5, 1962, in the name of Robert C. Staats, it has been found that acceleration exerted on the inertial instrument by external forces may be determined accurately by measuring the currents supplied by the suspension system to the supporting electrodes. In such a suspension system, the current is supplied to the electrodes in form of an AC signal having a sinusoidal form. Certain harmonics are present in this signal, but these harmonics form only a small fraction of the total signal and even a smaller fraction of the total force produced at the electrodes. To arrive at an accurate acceleration readout it is desirable to first convert this AC signal into a DC signal which is an accurate representation of the total power delivered to the supporting electrodes. This in turn will be an accurate indication of the accelerating forces acting on the instrument.

Since the power delivered to the electrodes is a function of the current squared or voltage squared at the electrode, what is desired is not merely an average value of the current or voltage, but rather the RMS value of such current or voltage. No suitable means, however, could be found in the prior art for measuring the RMS value of an electric signal, other than a pure sinusoid, with the accuracy required for this particular application. It has been found that the harmonics contribute approximately .1 percent of the total signal. By computation, it can be determined that, while the harmonics contribute the same .1 percent to the average value of the signal, they contribute only .0001 percent to the RMS value. The measurement of the average value, therefore, is not an accurate representation of the RMS value.

The force acting on the inertial member as the result of an electric field established between the member and a supporting electrode may be described by the following equation:

$$\overline{F} = K\overline{V^2} \quad (1)$$

where K is a constant determined by the physical relations of the inertial member and the supporting electrode and V is the voltage between the member and the electrode which may be described by the following equation:

$$V = V(t) = \sum_{n=1}^{\infty} Vn \sin(n\omega t + \phi_n) \quad (2)$$

Squaring and averaging gives:

$$\overline{V^2} = \overline{V(t)^2} \sum_{n=1}^{\infty} \left(\frac{Vn}{\sqrt{2}}\right)^2 \quad (3)$$

Note that $V_n/\sqrt{2}$ is the RMS value of the $n$th harmonic. Rewriting the sum and using RMS values results in:

$$\overline{F} = -\frac{\epsilon A}{2X^2} V_1^2 \left[1 + \left(\frac{V_2}{V_1}\right)^2 + \left(\frac{V_3}{V_1}\right)^2 + \cdots + \left(\frac{Vn}{V_1}\right)^2\right] \quad (4)$$

Note that $Vn/V_1$ is the fractional harmonic value and that this ratio is squared in the force expression. Thus, a harmonic value 0.1 percent or less produces one p.p.m. (part per million) or less of the total force.

A full-wave averaging device produces a direct voltage of the form:

$$V_{DC} = \overline{V(t)} \Big|_0^{\frac{\pi}{\omega}} = \frac{1}{2T} \int_0^{\frac{\pi}{\omega}} V(t) dt$$

$$= \frac{\omega}{\pi} \int_0^{\frac{\pi}{\omega}} \sum_{n=1}^{\infty} \sin(n\omega t - \phi_n) dt$$

$$= \frac{\omega}{\pi} \sum_{n=1}^{\infty} \frac{Vn}{n\omega} \cos(n\omega t + \phi_n) \Big|_0^{\frac{\pi}{\omega}} \quad (5)$$

For the worst case ($\phi_n = o$)

$$\overline{Vn} = \frac{2}{\pi} \frac{Vn}{n} \text{ for odd harmonics} \quad (6)$$

All even harmonics contribute no average value. The voltage output of such an average converter is:

$$V_{DC} = \overline{V(t)} \Big|_0^{\frac{\pi}{\omega}} = \frac{2}{\pi} V_1 \left[1 + \frac{V_3}{3V_1} + \frac{V_5}{5V_1} + \frac{V_7}{7V_1} + \cdots\right] \quad (7)$$

Thus, the harmonic shows up in the rectified average in nearly the same percentage it had in the original waveform.

The contribution of the harmonics to the RMS value and to the force acting on the member, however, is much smaller. For example, assume that the voltage signal at the supporting electrode has a .1 percent third harmonic distortion, then according to Equation 2 above (assuming $V_n=1000$), $V(t) = 1000 \sin \omega T + \sin 3\omega T$ (0.1 percent third harmonic distortion)

$$F = K\overline{V(t)^2} = K \times \frac{10^6}{2}\left[1 + \left(\frac{1}{1000}\right)^2\right]$$

$$= K\frac{10^6}{2}[1 + 10^{-6}] \quad (8)$$

Thus, the distortion has virtually no affect on the force. The average-reading rectifier, however, will read:

$$V(t) = \frac{2}{\pi} \times 1000\left[1 + \frac{1}{3(1000)}\right]$$

$$= \frac{2}{\pi} \times 1000[1 + 3.3 \times 10^{-4}] \quad (9)$$

$$F = K_1\overline{Vt^2} = K_1\frac{4}{\pi^2}10^6[1 + 6.6 \times 10^{-4}] \quad (10)$$

A measurement error of 660 p.p.m. exists where a force difference of only 1 p.p.m. was indicated.

It would appear from the above equations that an average reading rectifier device could not be used to give indication of the RMS value to an adequate accuracy. If, however, the average reading rectifier device has a harmonic filter added, with 50 decibels rejection of the third harmonic, the output will be:

$$V(t) = \frac{2}{\pi}1000\left[1 + \frac{1}{3(1000)(316)}\right] \quad (11)$$

$$= \frac{2}{\pi}1000[1 + 1.04 \times 10^{-6}] \quad (11a)$$

and $$F = K\overline{Vt^2} = K\frac{4}{\pi^2}10^6[1 + 2 \times 10^{-6}] \quad (12)$$

Thus, the force is read correctly to within a very small margin of error.

By combining a high performance average detector and a harmonic filter, the present invention provides means for accurately measuring RMS value of a current or voltage.

It is therefore an object of the present invention to provide a means for accurately measuring the RMS value of a voltage or a current signal.

Figure 2:
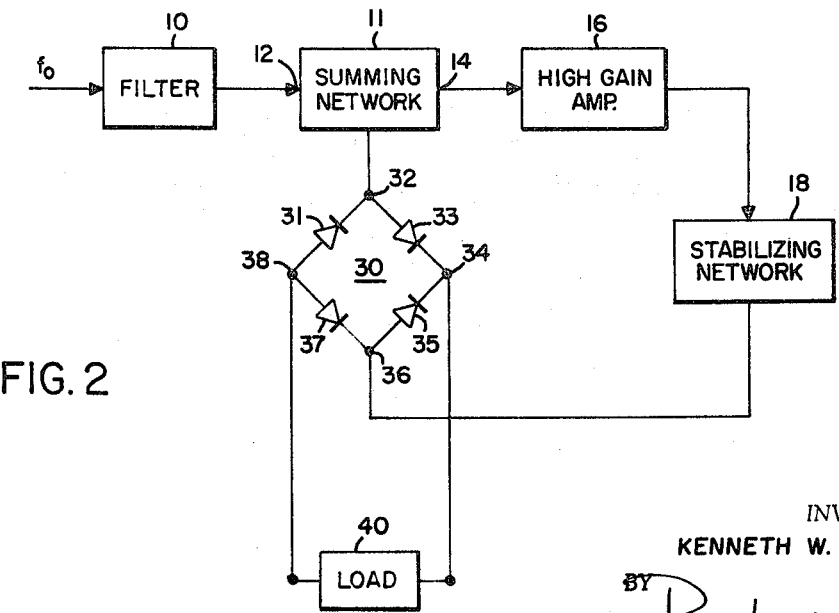

Other objects will become apparent to those skilled in the art, upon examination of the following specification, claims, and drawing, of which:

FIGURE 1 is a schematic block diagram of the apparatus of the present invention; and FIGURE 2 is a somewhat more detailed block diagram of the same apparatus.

Referring now to FIGURE 1, a harmonic filter 10 is provided to receive at its input an input AC signal. Filter 10 has an output connected to an input 12 of a summing network 11. Summing network 11 has a second input 13 and an output 14. At output 14 appears a signal which is a sum of the signals appearing at inputs 12 and 13. The signal from output 14 of summing network 11 is amplified by an error amplifier 16, whose output is connected to a second filter 18. The filtered signal from filter 18 is applied to a rectification circuit 20, which has a first output 21 at which appears a DC signal which is a function of the input AC signal, and a second output 22 as which appears an AC signal proportional to the input AC signal. The AC signal from output 22 of rectification circuit 20 is applied to input 13 of summing network 11.

The function of input filter 10 is to remove harmonics from input sine wave signal $f_0$. This input filter must have sharp cutoff characteristics. The chief harmonic to suppress is usually the third. This input filter is typically a medium impedance device. It can be made to match a range of source resistances, but if very high or low values must be used, matching sections may be necessary. Error amplifier 16 is a high gain, high output impedance device. Unloaded, it should have a voltage gain of about $10^5$. This will produce a diode turn ON in the rectification network which is less than $10^{-5}$ volt. This is necessary to produce the desired resolution. Loaded, the loop gain should be $10^3$ or greater to reduce harmonic distortion to a tolerable level of less than 1 percent. The rectification network may be a simple diode bridge circuit which will provide an AC feedback signal for amplifier 16 and a DC output signal. Output filter 18 serves to stabilize the loop with proper gain and phase margins. This will usually be an R-C laglead filter.

In FIGURE 2, which is very similar to FIGURE 1, amplifier 16 is identified as a high gain amplifier and filter 18 is identified as stabilizing network, which more accurately describes its function. Rectifier network is shown as a diode bridge 30 comprised of diodes 31, 32, 33, and 34, connected between terminals 32, 34, 36, and 38. The output of stabilizing network 18 is connected to terminal 36 of bridge network 30. Terminal 32 of the bridge is connected to input 13 of summing network 11. A load 40 is connected between terminals 34 and 38 of bridge network 30.

The arrangement of diode bridge 30 is such that, as it receives the AC signal from stabilizing network 18, it provies a rectified output between terminals 34 and 38 and supplies the DC signal thus generated to load 40. The AC signal is at the same time transmitted on to terminal 32 of the bridge network and is apllied to input 13 of summing network 11. If the percentage of the harmonics in signal $f_0$ at the input of harmonic filter 10 is sufficiently small, the D.C. output supplied to load 40 will be a very accurate indication of the RMS value of $f_0$.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:

1. Apparatus for providing an accurate indication of the RMS value of an AC signal, said apparatus comprising:

a harmonic filter for removing harmonics from an AC signal, said filter means having an input and an output;

summing means having a first input connected to the output of said filter means and having a second input and an output;

an amplifier;

a stabilizing network;

rectifier network means having an input for receiving an AC signal and having an output at which appear a DC signal indicative of the average amplitude of the AC signal at its output; and means including said amplifier means and said stabilizing network means, connecting the output of said summing means to the input of said rectifier network means and also to said second input of said summing means.

2. Apparatus according to claim 1, wherein said harmonic filter is adapted to remove the third harmonic of a specific frequency AC input signal, said filter further having sharp cutoff characteristics.

3. Apparatus according to claim 1, wherein said amplifier has a gain of more than 10,000.

4. Apparatus according to claim 1, wherein said rectifier network means is of the diode bridge type.

5. Apparatus according to claim 4, wherein said amplifier has a gain of more than 10,000.

References Cited

UNITED STATES PATENTS 3,024,415  3/1962  Burklund et al. ___ 324—119 X
3,281,689  10/1966  Schneider et al. ___ 328—144 X

FOREIGN PATENTS 860,681  2/1961  Great Britain.

LEE T. HIX, *Primary Examiner.*
JOHN F. COUCH, *Examiner.*
W. H. BEHA, Jr., *Assistant Examiner.*